(12) United States Patent
Parikh et al.

(10) Patent No.: US 8,095,865 B2
(45) Date of Patent: Jan. 10, 2012

(54) LAYOUT MANAGER

(75) Inventors: Sujal S. Parikh, Redmond, WA (US); David P. Relyea, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/943,603

(22) Filed: Nov. 21, 2007

(65) Prior Publication Data

US 2009/0132578 A1 May 21, 2009

(51) Int. Cl.
| | |
|---|---|
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 3/00 | (2006.01) |
| G06F 9/44 | (2006.01) |
| G06F 11/00 | (2006.01) |

(52) U.S. Cl. ............ 715/210; 715/234; 715/744; 714/1; 717/117

(58) Field of Classification Search ............... None
See application file for complete search history.

(56) References Cited

U.S. PATENT DOCUMENTS

| | | | |
|---|---|---|---|
| 6,750,887 B1 | 6/2004 | Kellerman et al. | |
| 7,073,130 B2 | 7/2006 | Novak et al. | |
| 7,100,112 B1* | 8/2006 | Winser ...................... | 715/210 |
| 7,386,835 B1* | 6/2008 | Desai et al. ............... | 717/117 |
| 7,712,025 B2* | 5/2010 | Roessler .................... | 715/234 |
| 2004/0123239 A1* | 6/2004 | Roessler .................... | 715/513 |
| 2004/0225960 A1 | 11/2004 | Parikh et al. | |
| 2004/0230940 A1 | 11/2004 | Cooper et al. | |
| 2005/0091605 A1 | 4/2005 | Parikh et al. | |
| 2005/0246326 A1 | 11/2005 | McKeon | |
| 2005/0289450 A1 | 12/2005 | Bent et al. | |
| 2006/0218489 A1 | 9/2006 | Ovetchkine et al. | |
| 2006/0253775 A1 | 11/2006 | Ovetchkine et al. | |
| 2006/0253796 A1 | 11/2006 | Wang et al. | |
| 2006/0282697 A1* | 12/2006 | Sim-Tang .................. | 714/1 |
| 2007/0097138 A1* | 5/2007 | Sorotokin et al. .......... | 345/581 |

OTHER PUBLICATIONS

International Search Report and Written Opinion for PCT Application No. PCT/US2008/083663, mailed on Jun. 26, 2009, 11 pages.

"SpringLayout: A Powerful & Extensible Layout Manager", http://jdj.sys-con.com/read/37300.htm.

(Continued)

*Primary Examiner* — Shin-Hon Chen (57) ABSTRACT

Various technologies and techniques are disclosed for managing layout updates to user interface elements. A dirty state of user interface elements is tracked in a tree with multiple nodes of user interface elements. The dirty state allows dirty subtrees of the nodes to be identified. A root node is identified for each of the dirty subtrees. Affected portions of the tree are updated, starting with the root node that was identified for each of the dirty subtrees. As part of the update process, changes to ancestor nodes are detected and used to make a layout process more efficient. For example, any layout processes that are currently being performed on any descendant nodes of a changed ancestor are abandoned, and the layout process is resumed at the changed ancestor. After updating affected portions of the tree, the updated user interface elements are then rendered on an output device.

12 Claims, 8 Drawing Sheets

OTHER PUBLICATIONS

"Tip/Trick: Supporting Full Screen Mode with Silverlight", http://www.123aspx.com/redir.aspx?res=36293.

"WinLayoutManagers", http://www.infragistics.com/Control.aspx?id=1544#Overview.

Berktas., et al. "Interactive Query Interfaces (VIQY) for Patika Tools", Senior Project High-Level Design Report Dec. 12, 2006, pp. 1-17.

CN Office Action, Chinese Application No. 200880117432.3, dated Aug. 24, 2011, 11 pages.

"SpringLayout: A Powerful & Extensible Layout Manager", http://jdj.sys-con.com/read/37300.htm, last viewed on Sep. 12, 2007, 7 pages.

"Tip/Trick: Supporting Full Screen Mode with Silverlight", http://www.123aspx.com/redir.aspx?res=36293, last viewed on Sep. 12, 2007, 10 pages.

"WinLayoutManagers", http://www.infragistics.com/Control.aspx?id=1544#Overview, last viewed on Sep. 12, 2007, 1 page.

* cited by examiner

LAYOUT MANAGER

BACKGROUND

Modern computer operating systems have the ability to present and manage graphical user interface elements on an output device, such as a monitor or printer. When a graphical user interface element is created within an application, the item is sized and placed appropriately for rendering on the output device. Similarly, when an existing graphical user interface element is modified or removed within an application, or a new user interface element is added, the output device must reflect this change appropriately. Existing computer operating systems make use of device drivers to communicate with particular output devices, thus sparing a software developer from the messy details of rendering graphical output on specific output devices. Existing computer operating systems accomplish this by publishing Application Programming Interfaces ("APIs") to prospective software developers.

Generally, an API is a set of high-level function calls made available to a software developer that are independent from the low-level instructions necessary for any particular device. The platform or operating system, with the aid of device drivers, typically performs any needed translation of the high-level API calls to the low-level device-specific calls.

Nevertheless, although a software developer may not wish to concern himself with implementing how his application's graphical user interface elements are physically displayed or rendered on any particular output devices, the developer may be interested in how those elements are logically laid out and managed. For example, a software developer may wish to develop a graphical user interface that displays its menus or arranges icons in a particular manner. Or a developer may wish to develop an application that arranges and displays multiple graphical user interface elements in a single document in a particular fashion. Some tools have given software developers certain abilities to manage graphical layouts, but such abilities are often complex or inefficient.

SUMMARY

Various technologies and techniques are disclosed for managing layout updates to user interface elements. The dirty state of user interface elements is tracked in a tree of user interface elements. The tree contains multiple nodes of user interface elements, and the dirty state allows dirty subtrees of the nodes to be identified. A root node is identified for each of the dirty subtrees. Affected portions of the tree are updated, starting with the root node that was identified for each of the dirty subtrees. After updating affected portions of the tree, the updated user interface elements are then rendered on an output device.

In one implementation, changes to ancestor nodes are detected and used to make a layout process more efficient. A layout process is started on a specified node. A determination is made as to whether or not any ancestors of the specified node have changed. If at least one changed ancestor of the specified node is identified, then any layout processes that are currently being performed on any descendant nodes of the changed ancestor are abandoned, and the layout process is resumed at the changed ancestor.

In another implementation, a layout status can be invalidated for a specified node. A determination is made as to whether or not a specified node is already dirty. If the specified node is not already dirty, then the specified node is marked as dirty and a determination is made as to whether or not the specified node is an ancestor of at least one node that is currently being laid out (measured or arranged). If the specified node is the ancestor of at least one node that is currently being laid out, then all nodes on a direct path from the specified node to the node that is currently being laid out (measured or arranged) are marked as having a dirty ancestor, but not including the specified node.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a layout manager application that coordinates the update of sizes and positions of user interface elements on an output device, but the technologies and techniques also serve other purposes in addition to these. In one implementation, one or more of the techniques described herein can be implemented as features within a platform such as MICROSOFT® Silverlight, an operating system such as MICROSOFT® WINDOWS®, or from any other type of program or service that is responsible for coordinating updates to user interface elements on an output device.

In one implementation, a layout manager is provided that coordinates the updating of the size and position of user interface elements so the updates can then be rendered on an output device. The term "user interface element" as used herein is meant to include any user interface object, such as listboxes, combo boxes, tree structures, radio buttons, calendars, windows, forms, panels, and combinations thereof. New implementations of user interface objects are being constantly created and these examples disclosed also embrace user interface elements that have not specially been named. The user interface elements are organized into a tree of nodes so that their status can be tracked and updated. The term "tree" as used herein is meant to include multiple user interface elements that are represented in a hierarchy or other structure that allows relationships between the user interface elements to be identified. The term "node" as used herein is meant to include an individual user interface element within a tree of multiple user interface elements.

As parts of a given program run that impact user interface elements, the layout manager uses the tree of nodes to track these changes to the user interface elements. For example, one or more status indicators can be updated for a node in the tree to identify that one or more details of the user interface element have changed. As a non-limiting example, code may have executed that changes the font size for the text that is contained in a particular text box on the user interface. In one implementation, a dirty indicator is marked on the changed node to flag the node as having one or more changed details that may need updating the next time the user interface is re-rendered. These status indicators are tracked by the layout manager and are then used to determine what updates should be rendered for the user interface elements for the given program displayed on an output device.

For example, the status indicators can be used by a layout process that is called by the layout manager before re-rendering updates to the user interface. The term "layout process" as used herein is meant to include the process of sizing and positioning of user interface elements. The term "laid out" as used herein is meant to include the fact that a user interface element has been sized and positioned to reflect the changes that have impacted this user interface element thus far. A layout process can include a measure process and/or an arrange process. A "measure process" is a process that deduces how big a particular user interface element wants to be. During a measure process, a node determines the size it requires by determining the size required by all of its children, or if the node has no children, by the size the node itself requires. When measuring its children (if any) the node provides a size constraint, which is typically the size the parent has left to allocate to the children the node has yet to measure; the size limitation may also be unbounded in one or both dimensions. In one implementation, regardless if a node has children or not, other constraints such as height, minimum height, maximum height, width, maximum width and minimum width may also be used if they have been specified. An "arrange process" is a process where a parent element notifies a child node of the position and of the size which that child node has been allocated to display itself in. This may be less than, greater than, or equal to the size that the node indicated it required in the measure process. The node will position and size itself on the screen accordingly. Properties such as stretch mode, horizontal alignment and vertical alignment may also be used to determine the node's position and/or size if specified.

In some implementations described in further detail in FIGS. 4-8, the status of changes that have occurred on ancestor nodes are used to make a layout process (e.g. measure and/or arrange processes) perform more efficiently. The term "ancestor node" as used herein is meant to include any predecessor node that is contained in an upward linear chain to a specified node. The term "parent node" as used herein is meant to include an immediate parent node (e.g. the father) of a specified node. When performing a layout process (measure and/or arrange process) for a given node, the layout manager determines if any ancestor nodes have changed. If any ancestor nodes have changed, then any layouts (measures and/or arranges) in process for descendant nodes (e.g. child nodes) beneath the changed ancestor are abandoned, and the layout process (measuring or arranging) is resumed at the changed ancestor. If no ancestor nodes to the specified node have not changed, then the layout process (measuring and/or arranging) continues by going down a path of descendant nodes. In one implementation, by recognizing that changes to ancestors have been made, wasted work can be avoided by processing changes at an ancestor level as opposed to a descendant level. This work could otherwise have been spent on processing changes to descendant nodes that could then become outdated when updates were later processed for ancestor nodes. Some of these techniques will now be explored in further detail.

Figure 1:
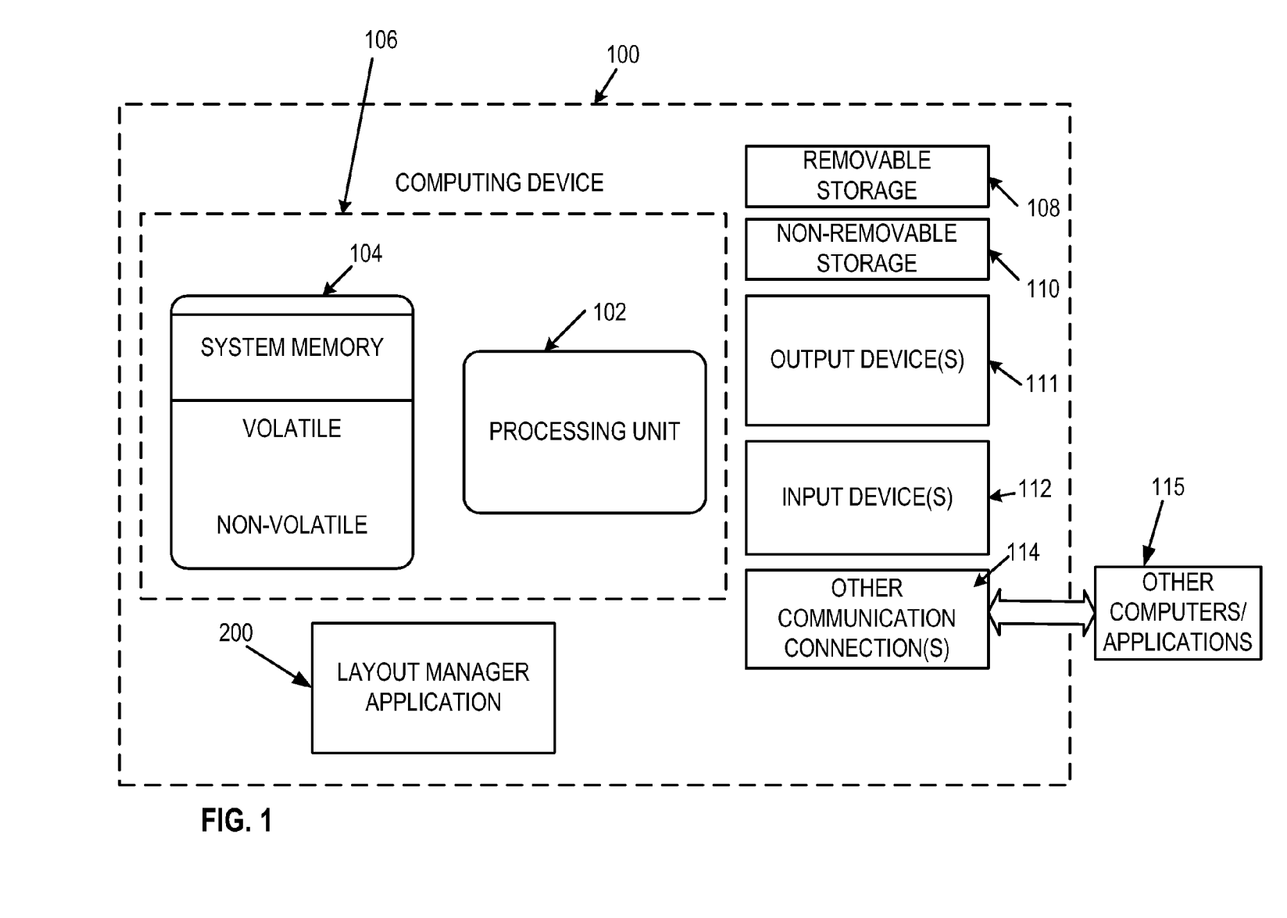
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes layout manager application 200. Layout manager application 200 will be described in further detail in FIG. 2.

Figure 2:
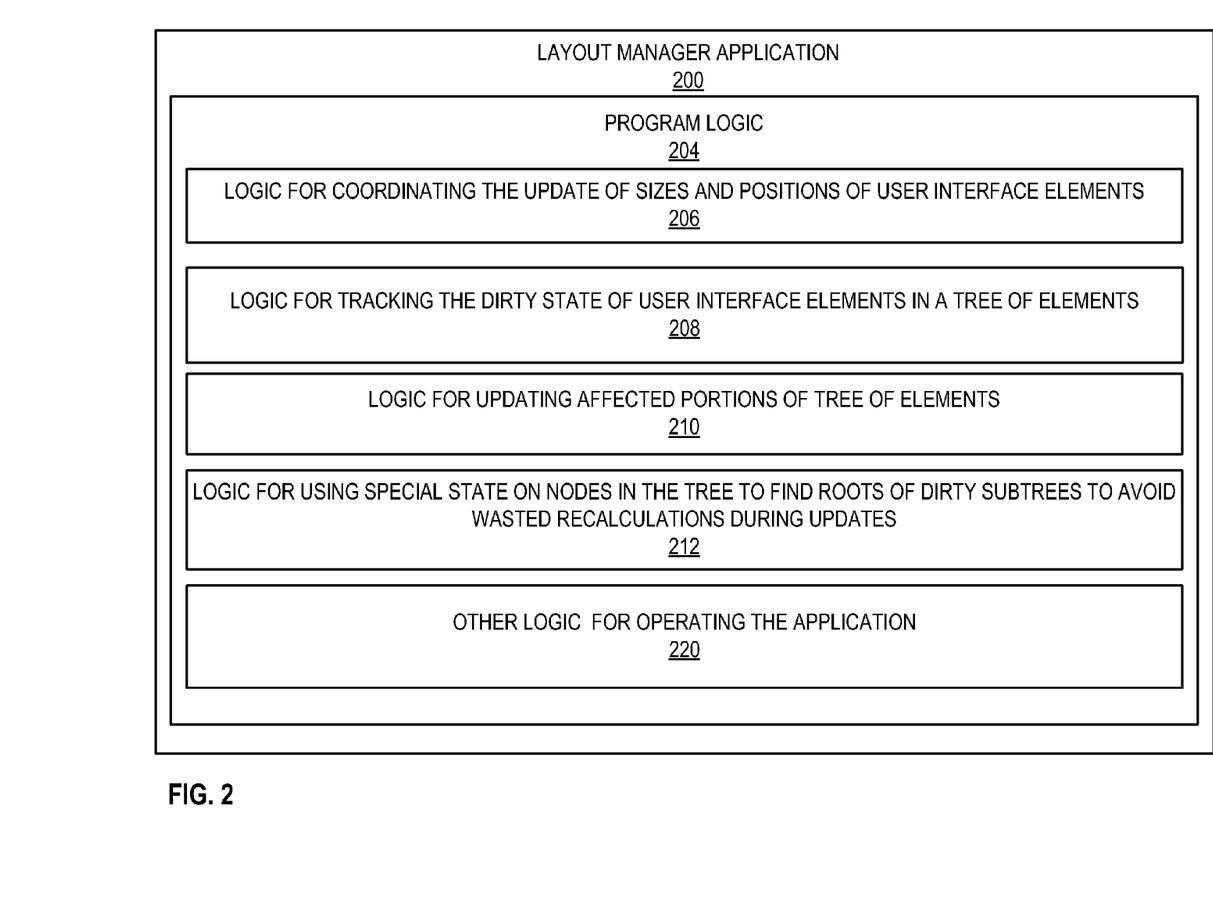
FIG. 2 is a diagrammatic view of a layout manager application of one implementation operating on the computer system of FIG. 1.

Turning now to FIG. 2 with continued reference to FIG. 1, a layout manager application 200 operating on computing device 100 is illustrated. Layout manager application 200 is one of the application programs that reside on computing device 100. However, it will be understood that layout manager application 200 can alternatively or additionally be embodied as computer-executable instructions on one or more computers and/or in different variations than shown on FIG. 1. Alternatively or additionally, one or more parts of layout manager application 200 can be part of system memory 104, on other computers and/or applications 115, or other such variations as would occur to one in the computer software art.

Layout manager application 200 includes program logic 204, which is responsible for carrying out some or all of the techniques described herein. Program logic 204 includes logic for coordinating the update of sizes and positions of user interface elements 206 (as described below with respect to FIG. 3); logic for tracking the dirty state of user interface elements in a tree of elements 208 (as described below with respect to FIGS. 4-7); logic for updating affected portions of the tree of elements 210 (as described below with respect to FIG. 6); logic for using special state on nodes in the tree to find roots of dirty subtrees to avoid wasted recalculations during updates 212 (as described below with respect to FIGS. 4-7); and other logic 220 for operating the layout manager application 200.

Figure 3:
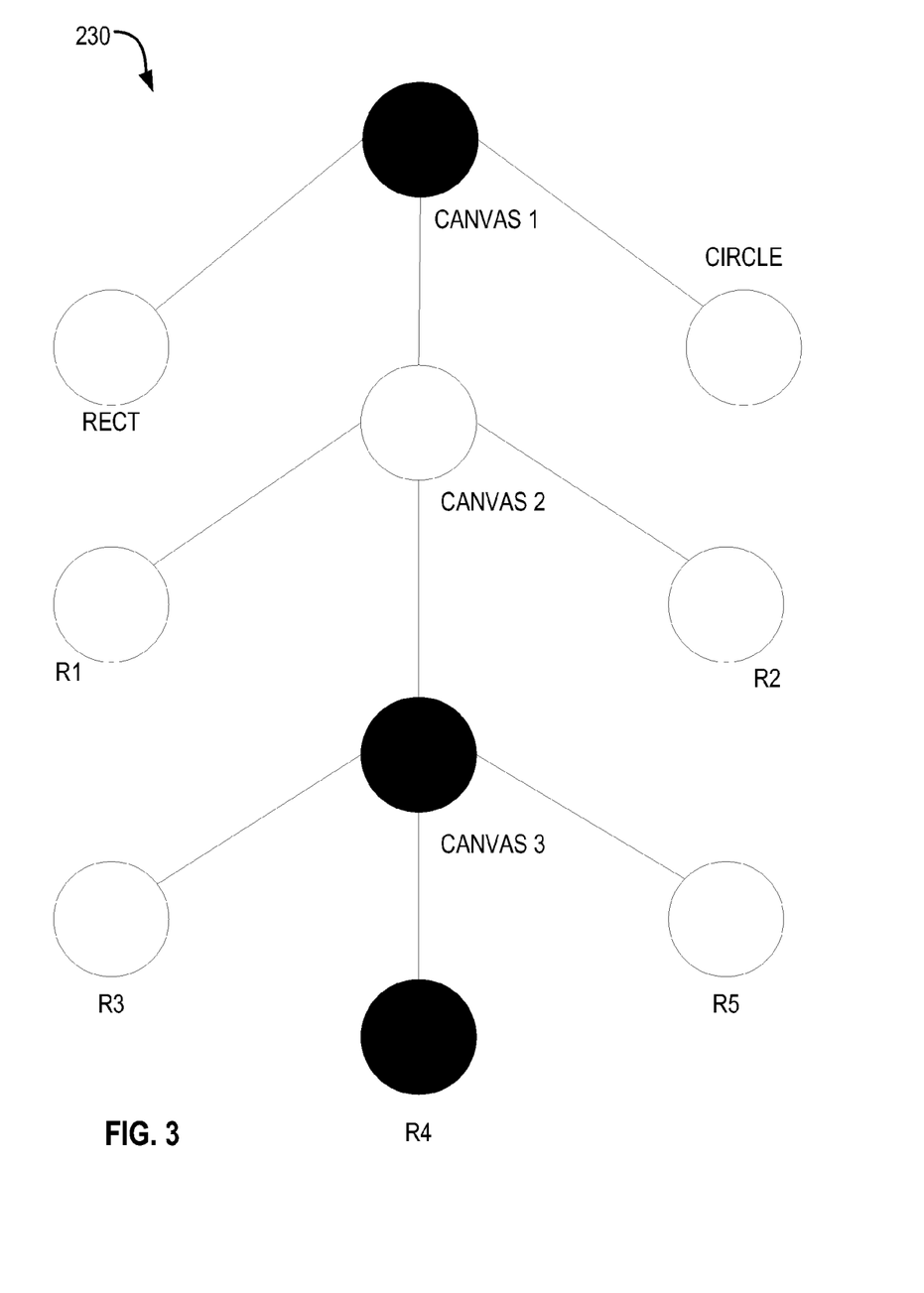
FIG. 3 is a diagrammatic view of an exemplary tree of nodes that has two different dirty subtrees of nodes.

FIG. 3 is a diagrammatic view of an exemplary tree of nodes that has two different dirty subtrees of nodes. The term "subtree" as used herein is meant to include a smaller subset of nodes within a tree, or stated another way, a tree within a tree. The term "dirty subtree" as used herein is meant to include one or more contiguous nodes of ancestors and descendants that are marked as dirty and that has only one node with a parent node that is not dirty. Let's look at a few examples to make this definition more clear. In the example shown in FIG. 3, there are two dirty subtrees. The first subtree contains canvas1. Canvas1 is the only member of the first subtree because it does not have an immediate ancestor or descendant that is also dirty. The second subtree contains canvas3 and R4. Canvas3 and R4 have an ancestor/descendant relationship, are contiguous, and canvas3 is the only member of the subtree that does not have an immediate ancestor that is also dirty. The concept of a dirty subtree will be used in the discussion of some of the later figures, such as FIG. 6.

Figure 4:
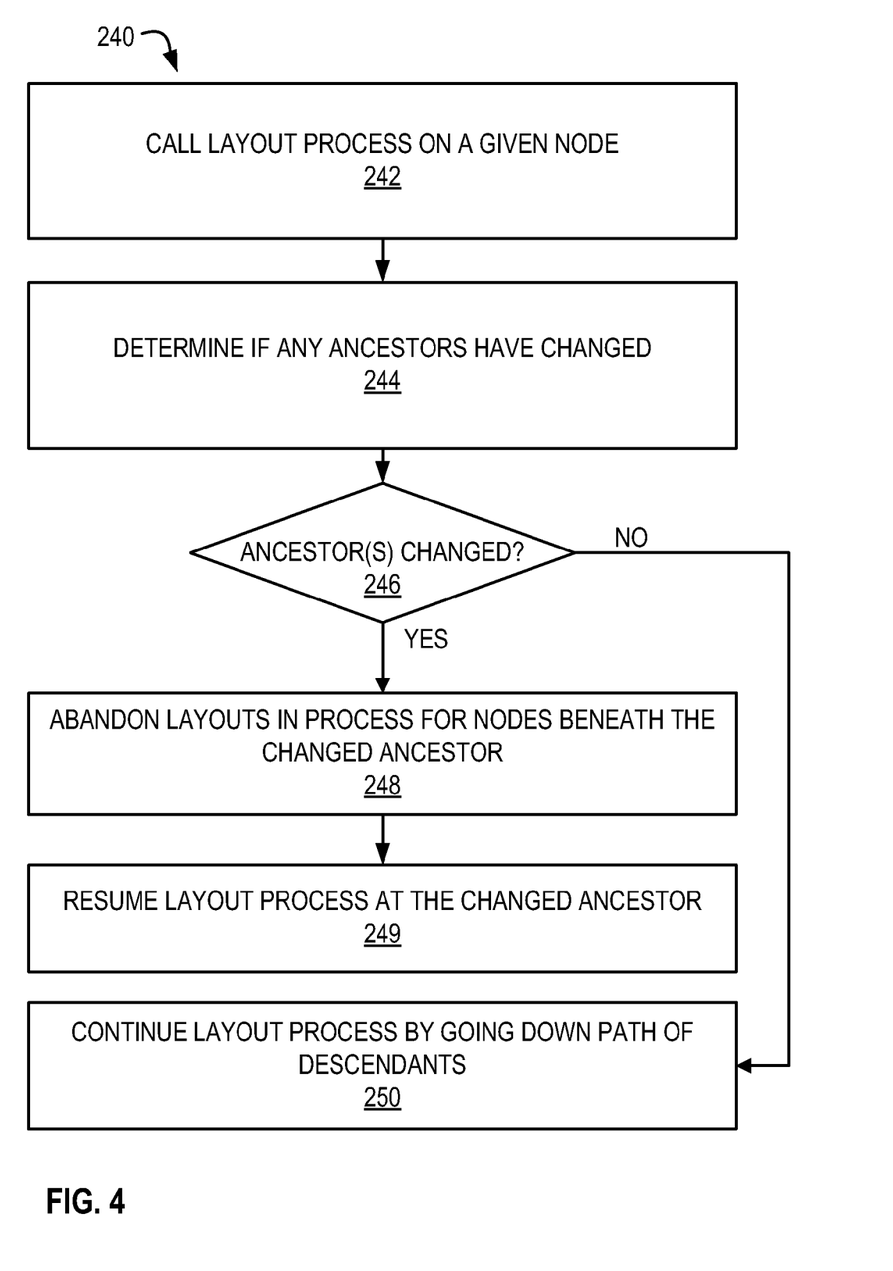
FIG. 4 is a process flow diagram for one implementation illustrating the stages involved in using a status of ancestor changes to make a layout process more efficient.
Figure 5:
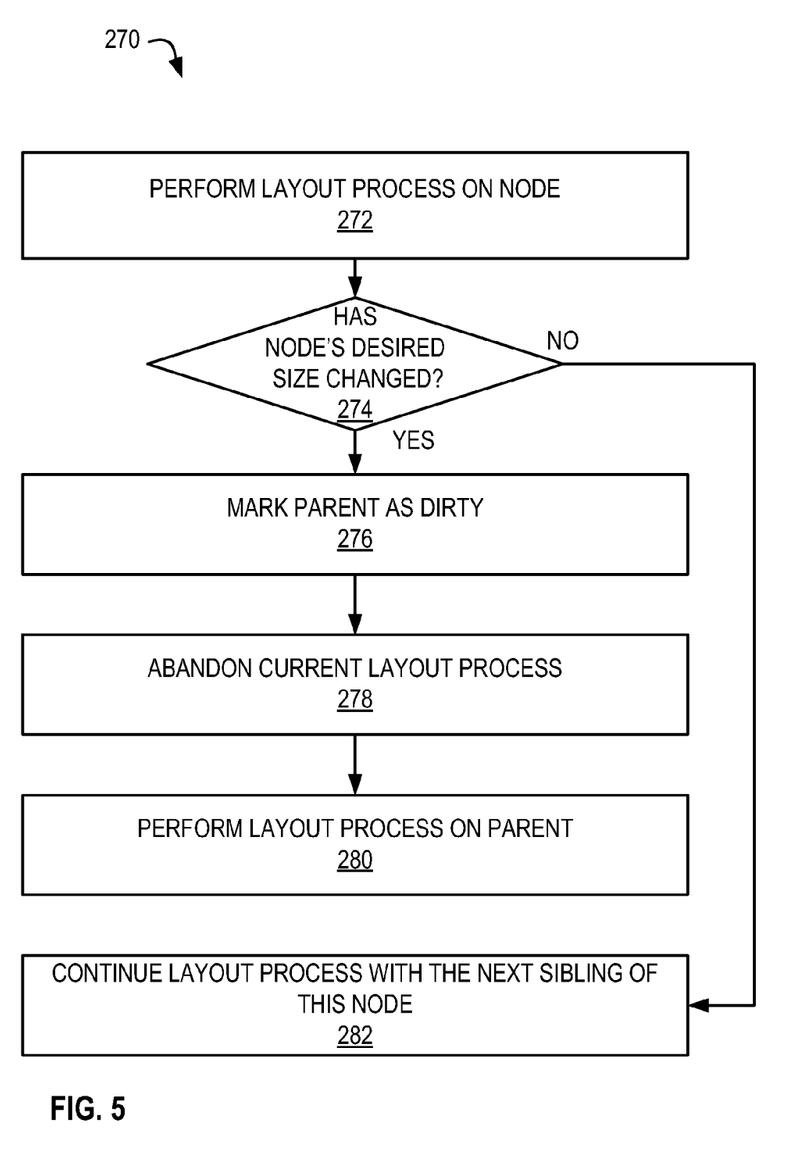
FIG. 5 is a process flow diagram for one implementation illustrating the stages involved in marking a parent dirty when a node's size has changed to avoid wasted work.
Figure 6:
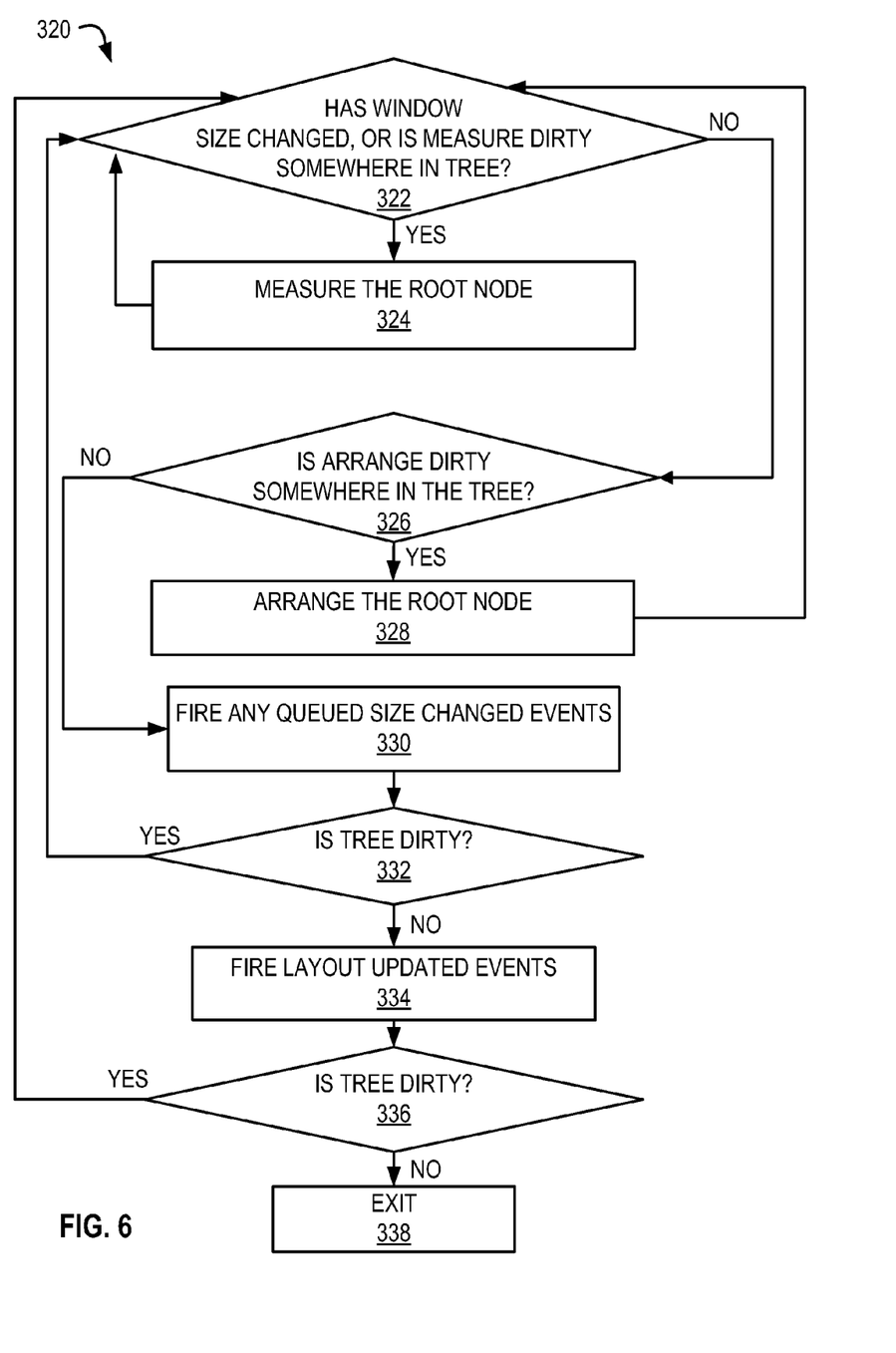
FIG. 6 is a process flow diagram for one implementation that illustrates the stages involved in updating a layout just before rendering by processing dirty subtrees of nodes.
Figure 7:
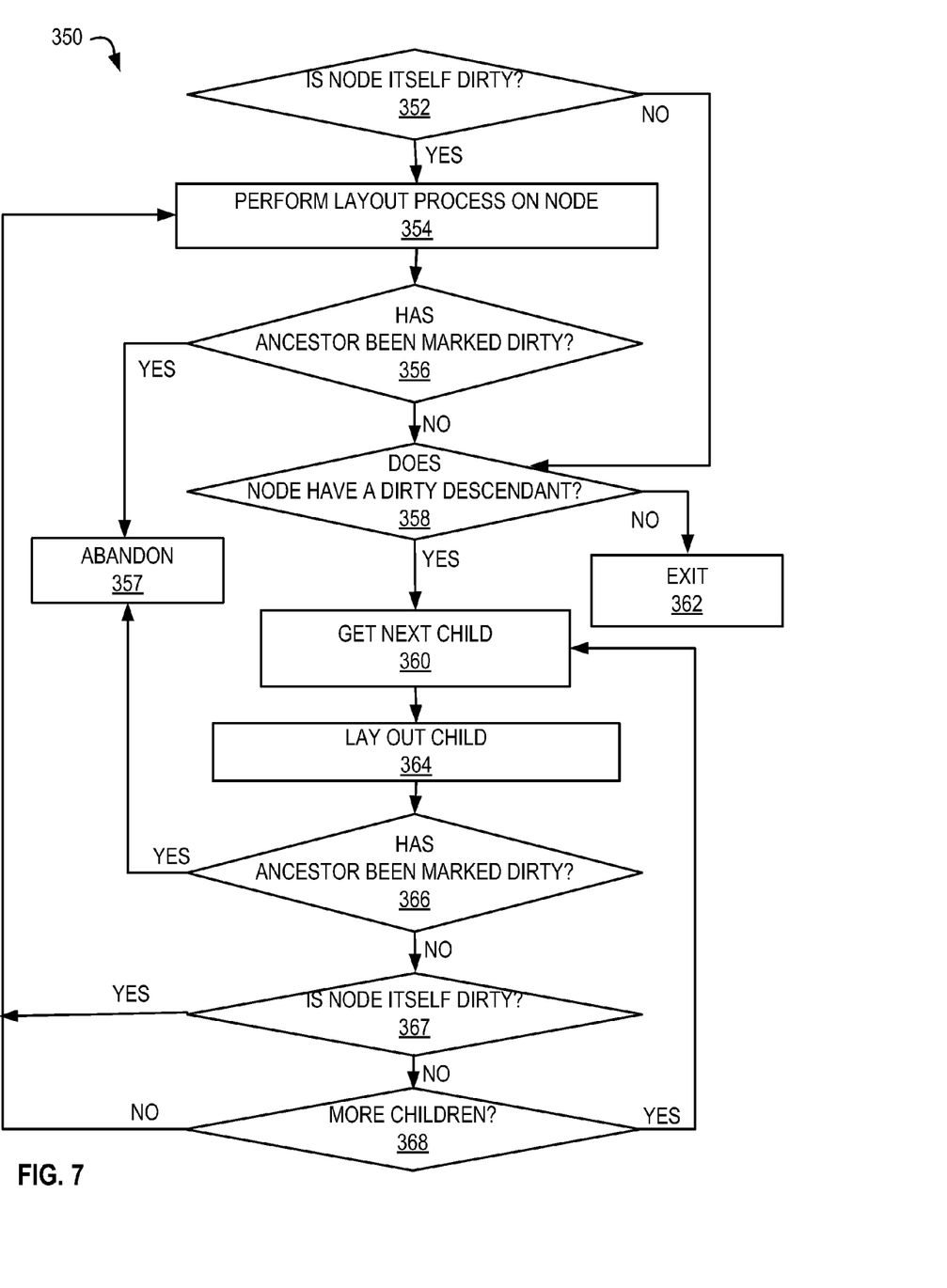
FIG. 7 is a process flow diagram for one implementation that illustrates the stages involved in performing a layout process on a specified node.
Figure 8:
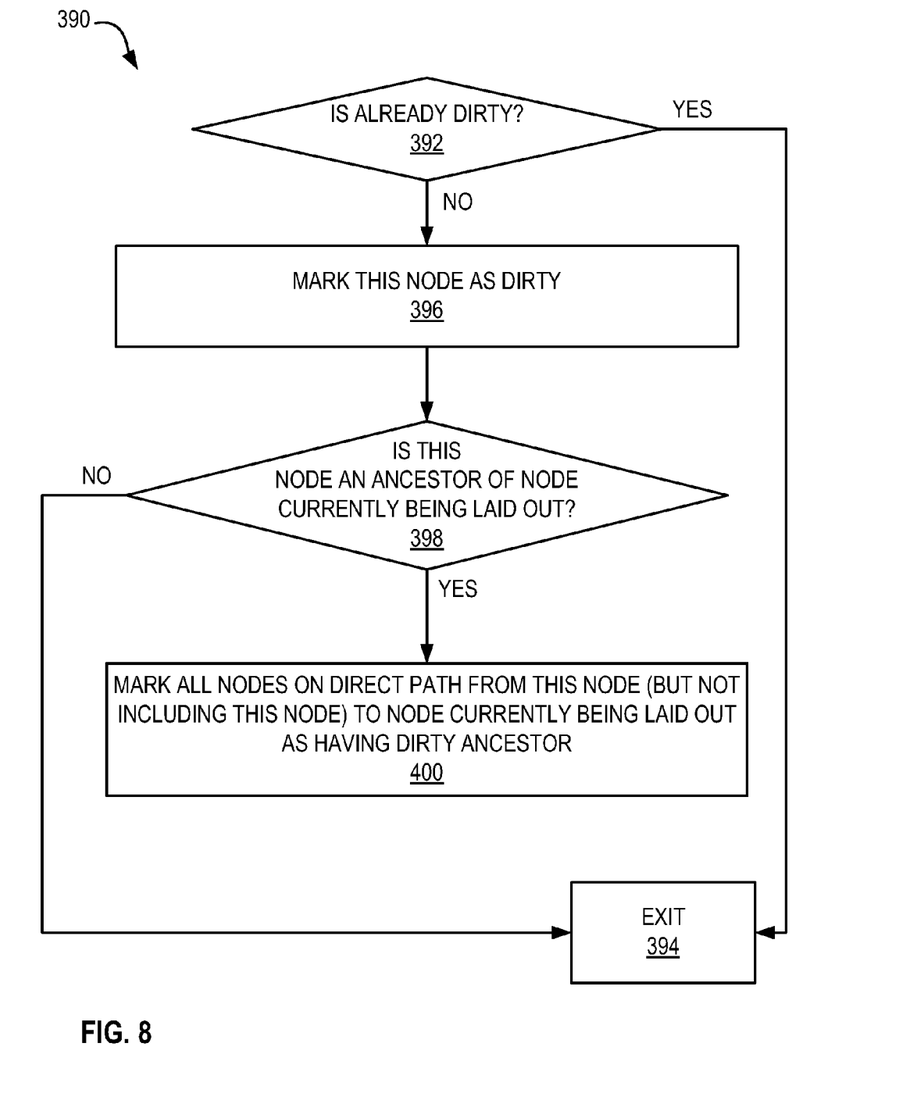
FIG. 8 is a process flow diagram for one implementation that illustrates the stages involved in invalidating a layout process.

Turning now to FIGS. 4-8 with continued reference to FIGS. 1-3, the stages for implementing one or more implementations of layout manager application 200 are described in further detail. In some implementations, the processes of FIG. 4-8 are at least partially implemented in the operating logic of computing device 100. FIGS. 4-5 provide some high level examples of using ancestor changes to make a layout process more efficient. FIGS. 6-8 describe some more detailed techniques for applying these broader concepts to exemplary implementations.

Turning now to FIG. 4, a process flow diagram 240 is shown that illustrates one implementation of the stages involved in using a status of ancestor changes to make a layout process (measure, arrange, etc.) more efficient. A layout process is called for a given node (stage 242). The layout manager application 200 determines if any ancestor nodes to the given node have changed (stage 244). If any ancestor(s) have changed (decision point 246), then the layouts in process for descendant nodes beneath the changed ancestor are abandoned (stage 248) and the layout process is resumed at the changed ancestor (stage 249). If no ancestor(s) have changed (decision point 246), then the layout process continues by going down the path of descendants (stage 250).

Turning now to FIG. 5, a process flow diagram 270 is shown that illustrates one implementation of the stages involved in marking a parent node as dirty when a node's size has changed to avoid wasted work. A layout process is started for a specified node (stage 272). If the node's desired size has changed (decision point 274), then a dirty indicator is marked on the parent node of the specified node (stage 278), the current layout process is abandoned (stage 278), and the layout process is performed on the parent (stage 280), as described in further detail in other figures. If the node's desired size has not changed (decision point 274), then the layout process continues with the next sibling of this node) (stage 282).

FIG. 6 is a process flow diagram 320 that illustrates one implementation of the stages involved in updating a layout just before rendering by processing dirty subtrees. Upon starting the update layout process, layout manager 200 determines whether the window size changed or whether somewhere in the tree, an element needs measured (e.g. measure is dirty) (decision point 322). The window can include any area of the screen that the user interface elements are being displayed in, such as the entire screen, a window in the screen, an area of a browser page, etc. If either of these conditions is true, then the root node of the dirty subtree is measured (stage 324) and the evaluation is then performed again recursively (to process children of each node). If neither of these conditions is true (decision point 322), then layout manager 200 determines whether somewhere in the tree, an element needs arranged (e.g. arrange is dirty) (decision point 326). If so, then the root node is arranged (stage 328) and the process loops back up to decision point 322.

If arrange is not dirty somewhere in the tree (decision point 326), then any queued size changed events are fired (stage 330) to allow the application to execute optional custom code in response to an element changing its size, before the element has been displayed with its new size. If the tree is dirty (decision point 332), then the process loops back up to decision point 322. If the tree is not dirty (decision point 332), then the layout updated events are fired (stage 334) to allow the application to execute custom code in response to an update layout operation completing, before any of the updated elements have been displayed with their new sizes and/or positions. If the tree is dirty (decision point 336), then the process loops back up to decision point 322. If the tree is not dirty (decision point 336), then the process exits (stage 338).

Turning now to FIG. 7, a process flow diagram 350 is shown that illustrates one implementation of some detailed stages involved in performing a layout process on a specified node. If the specified node itself is not dirty (decision point 352), then layout manager 200 checks to see if the specified node has a dirty descendant (decision point 358) and follows the processing for the dirty descendant path, as described momentarily. If the specified node itself is dirty (decision point 352), then the layout process is performed on the specified node (stage 354). If an ancestor node has now been marked as dirty (decision point 356), then the layout process is abandoned for the specified node (stage 357).

If an ancestor node has not been marked as dirty (decision point 356) after performing a layout on the specified node, then layout manager 200 determines whether the specified node has a dirty descendant (decision point 358). Layout manager also determines whether the specified node has a dirty descendant if the specified node itself was not found dirty in decision point 352. In either case, if the specified node does not have a dirty descendant (decision point 358), then the layout process exits (stage 362). If the specified node does have a dirty descendant (decision point 358), then the next child is retrieved (stage 360) and laid out (stage 364). After laying out the child, layout manager 200 determines whether an ancestor has been marked as dirty (decision point 366). If so (decision point 366), then the layout process is abandoned (stage 357). If an ancestor has not been marked as dirty (decision point 366), then layout manager 200 determines whether the node itself is dirty (decision point 367). If the node itself is dirty (decision point 367), then the layout process is performed for the node (stage 354) and the other stages following the layout processes performed as described previously. If the node itself is not dirty (decision point 367), then the next child is processed if there are more children (stage 368). If there are not more children (decision point 368), then the process loops back up to processing the next sibling node of current parent in the dirty subtree (stage 352).

In one implementation, six different indicators are maintained on each node in order to make some of the decisions described above and to determine how to efficiently handle the updates. The six exemplary indicators are shown below.

IsMeasureDirty bit: To mark a node as dirty for measure
IsOnPathToMeasureDirty bit: To mark a node as having a dirty descendant for measure
IsArrangeDirty bit: To mark a node as dirty for arrange
IsOnPathToArrangeDirty bit: To mark a node as having a dirty descendant for arrange
IsAncestorDirty bit: To mark a node as having a dirty ancestor
IsOnStack bit: To mark its layout (measure or arrange) is in progress In other implementations, fewer or additional indicators can be used. These indicators will now be used in the following code sample for the sake of illustration. This sample walks through some exemplary code for performing the layout processes described in FIGS. 6 and 7.

LayoutManager::UpdateLayout Pseudo-Code

```
While (true)
{
    If (the display area size changed, or the root has measureDirty or
onPathToMeasureDirty flags set)
    {
        pRoot->Measure(display area size);
    }
    Else if (the root has the arrangeDirty or onPathToArrangeDirty
flags set)
    {
        pRoot->Arrange(display area rectangle);
    }
    Else
    {
        If (there are SizeChanged events that need to be fired)
            Fire SizeChanged events
        If (the root does not require measuring or arranging (see
above))
            Fire LayoutUpdated events
    }
    Else
        Break; (exit the while loop)
}
```

CUIElement::Measure Pseudo-Code

```
CUIElement::Measure(availableSize)
{
    IsOnMeasureStack = true;
    IsAncestorDirty = false;
    while (true)
    {
        if (IsMeasureDirty || availableSize has changed)
        {
            MeasureInternal(availableSize);
            If (IsAncestorDirty || IsLayoutSuspended)
                Break;
            IsOnMeasureDirtyPath = false;
        }
        Else if (IsOnMeasureDirtyPath)
        {
            IsOnMeasureDirtyPath = false;
            Foreach (child in Children)
            {
                If (child->IsMeasureDirty || child->
                    IsOnMeasureDirtyPath)
                {
                    child->Measure(child->
                    PreviousConstraint);
                }
                If (IsAncestorDirty)
                {
                    IsOnMeasureDirtyPath = true;
                    goto Cleanup;
                }
                If (IsMeasureDirty)
                {
                    Break; // exit foreach loop
                }
            }
        }
        Else
            Break; // exit while loop
    }
Cleanup:
    IsOnMeasureStack = true;
}
```

CUIElement::Arrange Pseudo-Code

```
CUIElement::Arrange(finalRect)
{
    IsOnArrangeStack = true;
    IsAncestorDirty = false;
    while (true)
    {
        if (any node requires measure)
            break; // Exit the while loop
        if (IsArrangeDirty || finalRect has changed)
        {
            ArrangeInternal(availableSize);
            If (IsAncestorDirty || IsLayoutSuspended)
                Break;
            IsOnArrangeDirtyPath = false;
        }
        Else if (IsOnArrangeDirtyPath)
        {
            IsOnArrangeDirtyPath = false;
            Foreach (child in Children)
            {
                if (any element requires measure)
                    break; // exit foreach loop
                if (child->IsArrangeDirty || child->
                    IsOnArrangeDirtyPath)
                {
                    child-> Arrange(GetArrangeRect());
                }
                if (IsAncestorDirty)
                {
                    IsOnArrangeDirtyPath = true;
                    Break; // exit foreach loop
                }
            }
        }
        Else
            Break; // exit while loop
    }
Cleanup:
    IsOnArrangeStack = true;
}
```

As is noted above in the UpdateLayout procedure, the measure process is called if the display area size changed, or the root has IsMeasureDirty or onPathToMeasureDirty flags set to true (i.e. is either dirty itself or has a dirty descendant). Otherwise, if the root has the IsArrangeDirty or IsOnPathToArrangeDirty flags set, then the arrange process is called.

The measure and arrange processes shown in the exemplary code samples then recursively loop through the tree of nodes as appropriate to determine whether to measure or arrange upward with ancestors or downward with descendants depending on the evaluation of various criteria described therein (and in FIG. 7).

FIG. 8 is a process flow diagram 390 that illustrates one implementation of the stages involved in invalidating a layout process. If a specified node is already dirty (decision point 392), then the invalidate layout process exits (stage 394). If the specified node is not already dirty (decision point 392), then the specified node is marked as being dirty (stage 396). If the specified node is an ancestor of a node currently being laid out (decision point 398), then all nodes on the direct path from this node (but not including this node) to the node currently being laid out are marked as having a dirty ancestor (stage 400). If this node is not an ancestor of a node currently being laid out (decision point 398), then the invalidate layout process exits (stage 402).

Some exemplary source code is shown below to illustrate the process of FIG. 8 in further detail. In the example shown, an InvalidateMeasure process checks to see if the specified node is already on the stack (i.e. already being measured), and if so, the InvalidateMeasure process exits. The specified node is marked as dirty, and then the ancestor nodes are marked as being dirty.

```
UIElement::InvalidateMeasure( )
{
  // Do not dirty us if we are already being measured.
  If (CurrentOnStack == this)
  {
    Return;
  }
  // Mark ourselves dirty
  IsDirty = true;
  // Mark the breadcrumbs on all ancestors
  Ancestor = this.Parent;
  While (Ancestor != NULL && Ancestor.OnPathToDirty == false)
  {
    Ancestor.OnPathToDirty = true;
    Ancestor = Ancestor.Parent;
  }
  // Now, if we are on stack, then mark from current on stack to
  // us (but not including us) as having a dirty ancestor
  If (IsOnStack)
  {
    Child = CurrentOnStack;
    While (Child != NULL && Child != this)
    {
      Child.AncestoryDirty = true;
      Child = Child.Parent;
    }
  }
}
```

These non-limiting code examples were just provided for further illustration of some of these techniques. It will be appreciated by those in the computer software art that there are numerous other ways source code could be written to implement some or all of the techniques described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage medium having computer-executable instructions for causing a computer to perform steps, the computer storage medium not consisting of a propagating signal, the steps comprising:
   tracking a dirty state of user interface elements in a tree of user interface elements, the tree containing a plurality of nodes, and the dirty state being operable to allow one or more dirty subtrees of the nodes to be identified;
   identifying a root node for each of the dirty subtrees, the root node is a node that does not have an immediate ancestor that is also dirty, wherein the identifying of the root node for each of the dirty subtrees is facilitated by analyzing the dirty state and additional state associated with the nodes in the tree, wherein the additional state includes an indicator that specifies whether or not a selected one of the nodes has a dirty descendant node, wherein the additional state further includes an indicator that specifies whether or not a selected one of the nodes has a dirty ancestor node; and
   updating affected portions of the tree starting with the root node that was identified for each of the dirty subtrees, wherein the updating step starts with the root node that was identified for each of the dirty subtrees so that updates are not performed on child nodes in the dirty subtrees that are then later overwritten due to updates made in parent nodes.

2. The computer storage medium of claim 1, wherein the additional state includes an indicator that specifies whether or not a selected one of the nodes is currently being laid out.

3. The computer storage medium of claim 1, wherein the dirty state includes an indicator that specifies whether or not a selected one of the nodes is dirty.

4. The computer storage medium of claim 1, further having computer-executable instructions for causing a computer to perform steps comprising:
   rendering the user interface elements on an output device after updating the affected portions of the tree of user interface elements.

5. A method comprising:
   tracking a dirty state of user interface elements in a tree of user interface elements, the tree containing a plurality of nodes, and the dirty state being operable to allow one or more dirty subtrees of the nodes to be identified;
   identifying a root node for each of the dirty subtrees, the root node is a node that does not have an immediate ancestor that is also dirty, wherein the identifying of the root node for each of the dirty subtrees is facilitated by analyzing the dirty state and additional state associated with the nodes in the tree, wherein the additional state includes an indicator that specifies whether or not a selected one of the nodes has a dirty descendant node, wherein the additional state further includes an indicator that specifies whether or not a selected one of the nodes has a dirty ancestor node;
   abandoning a layout process that is currently being performed on child nodes, if any, in the dirty subtrees; and
   updating affected portions of the tree starting with the root node that was identified for each of the dirty subtrees, wherein the updating step starts with the root node that was identified for each of the dirty subtrees so that updates are not performed on child nodes in the dirty subtrees that are then later overwritten due to updates made in parent nodes.

6. The method of claim 5, wherein the additional state includes an indicator that specifies whether or not a selected one of the nodes is currently being laid out.

7. The method of claim 5, wherein the dirty state includes an indicator that specifies whether or not a selected one of the nodes is dirty.

8. The method of claim 5, further comprising:
rendering the user interface elements on an output device after updating the affected portions of the tree of user interface elements.

9. A method, comprising:
tracking a dirty state of user interface elements in a tree of user interface elements, the tree containing a plurality of nodes, and the dirty state being operable to allow one or more dirty subtrees of the nodes to be identified;
identifying a root node for each of the dirty subtrees, the root node is a node that does not have an immediate ancestor that is also dirty, wherein the identifying of the root node for each of the dirty subtrees is facilitated by analyzing the dirty state and additional state associated with the nodes in the tree, wherein the additional state includes an indicator that specifies whether or not a selected one of the nodes has a dirty descendant node, wherein the additional state further includes an indicator that specifies whether or not a selected one of the nodes has a dirty ancestor node; and
updating affected portions of the tree starting with the root node that was identified for each of the dirty subtrees, wherein the updating step starts with the root node that was identified for each of the dirty subtrees so that updates are not performed on child nodes in the dirty subtrees that are then later overwritten due to updates made in parent nodes.

10. The method of claim 9, wherein the additional state includes an indicator that specifies whether or not a selected one of the nodes is currently being laid out.

11. The method of claim 9, wherein the dirty state includes an indicator that specifies whether or not a selected one of the nodes is dirty.

12. The method of claim 9, further having computer-executable instructions for causing a computer to perform steps comprising:
rendering the user interface elements on an output device after updating the affected portions of the tree of user interface elements.

\* \* \* \* \*